Jan. 22, 1963  D. J. MUNSON ETAL  3,074,734
COLLAPSIBLE SERVING CART
Filed Jan. 17, 1962  2 Sheets-Sheet 1
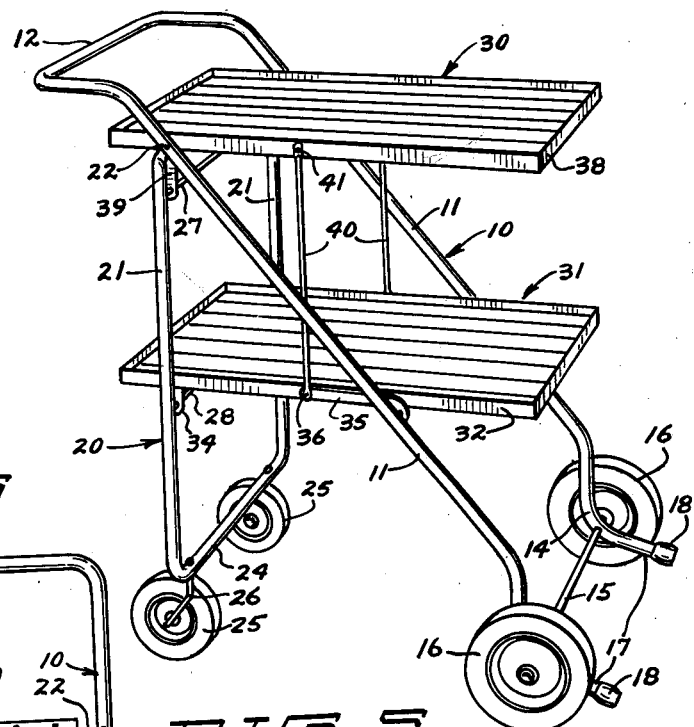
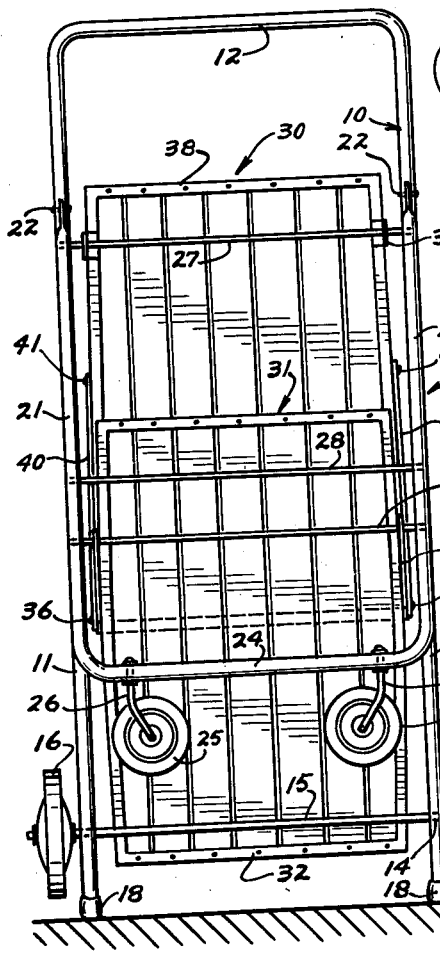
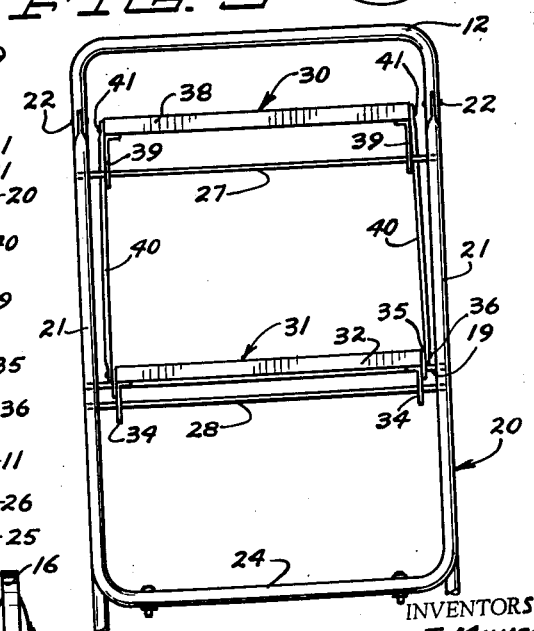
INVENTORS
DONALD J. MUNSON
BY LEONARD G. RIDGE
Carlsen & Carlsen
ATTORNEYS Jan. 22, 1963 D. J. MUNSON ETAL 3,074,734
COLLAPSIBLE SERVING CART
Filed Jan. 17, 1962 2 Sheets-Sheet 2
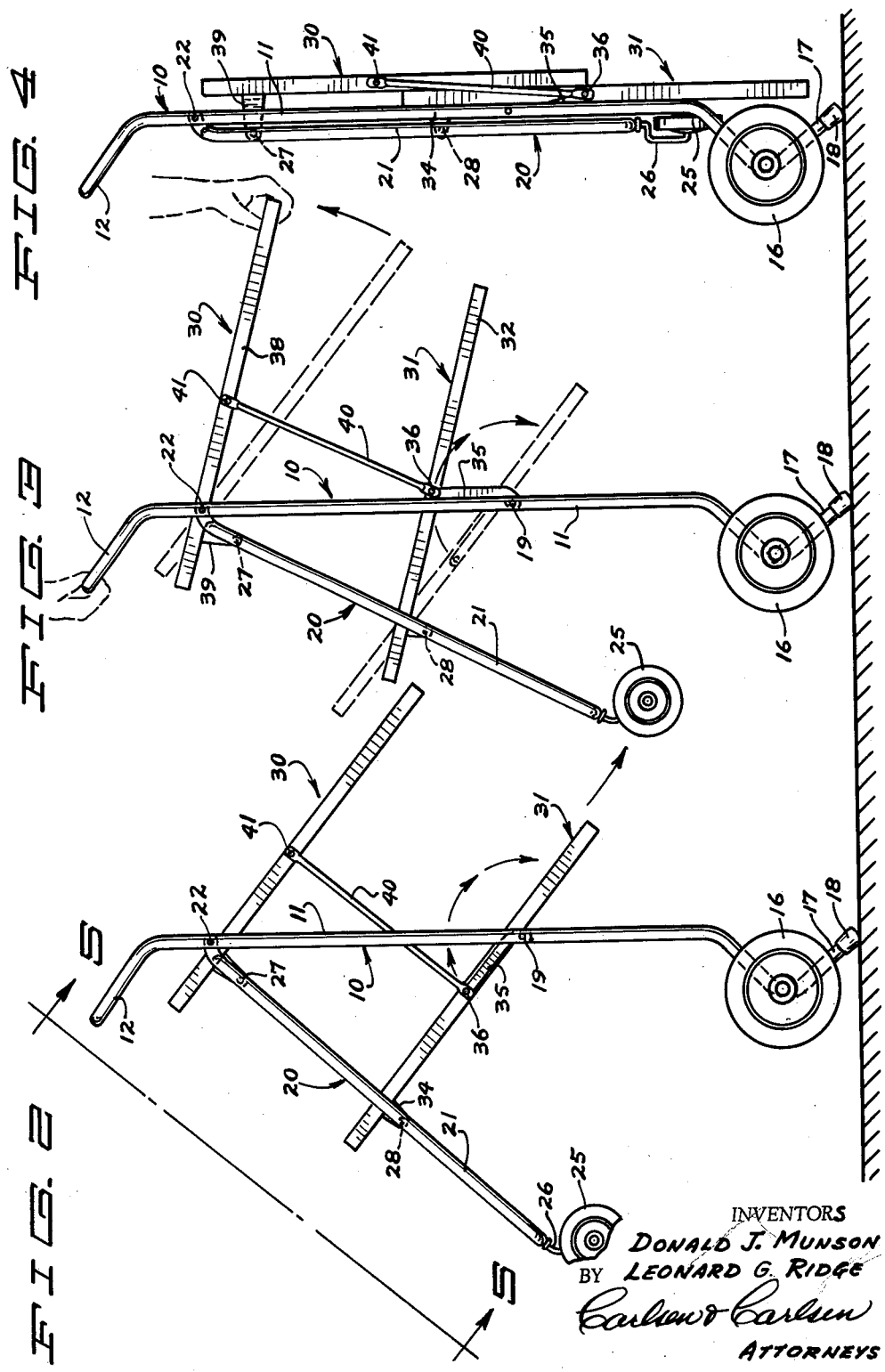
INVENTORS
DONALD J. MUNSON
BY LEONARD G. RIDGE
Carlsen & Carlsen
ATTORNEYS 3,074,734
COLLAPSIBLE SERVING CART
Donald J. Munson, Minneapolis, and Leonard G. Ridge, Anoka, Minn., assignors to The J. R. Clark Company, Spring Park, Minn., a corporation of Minnesota
Filed Jan. 17, 1962, Ser. No. 166,772
9 Claims. (Cl. 280—41)

This invention relates to improvements in serving carts of the multiple tray type such as used primarily for the transport and service of food and beverages.

The object of the invention is to provide a new and improved construction for a serving cart which allows the cart to be readily and simply converted between an erected usable condition and a compactly folded storable condition by manual gripping and actuation of a single conveniently accessible portion of the cart and wherein said conversion can only be accomplished by initially raising said cart portion whereby the cart is gravitationally held in either condition against accidental conversion.

With this object in mind the invention broadly comprises a pair of upright support frames pivotally interconnected near their upper ends for movement between a relatively closed condition and an erected condition with their lower ends spread apart, a pair of trays hinged on vertically spaced axes to one frame member and interconnected for movement in parallelism about their hinge axes, a tray rest on the other frame member for supporting the trays horizontally with the frames erected, and an over center control linkage pivotally interconnecting a tray to said other frame member for swinging the frame members to their closed condition as the tray is moved to swing the linkage forwardly over center and allowing the trays to be folded downwardly about their hinge axes against the frames.

The above mentioned and still additional objects of the invention will be brought to light during the course of the following specification, reference being made to the accompanying drawings, in which:

FIG. 1 is a perspective view of the cart in erected condition.

FIG. 2 is a right side elevation of the cart in erected condition and tilted forwardly preparatory to collapsing thereof.

FIG. 3 is similar to FIG. 2 with the cart in partially collapsed condition.

FIG. 4 is a side elevation of the cart in fully collapsed condition.

FIG. 5 is a partial rear elevation of the cart in erected condition as viewed along line 5—5 of FIG. 2.

FIG. 6 is a rear elevation of the cart in fully collapsed condition.

Referring now more particularly to the drawings, reference numerals will be used to denote like parts and structural features of the cart in the different views. A front support frame of general inverted U-shape is denoted generally at 10. The side legs 11 of this frame are parallel and the bight portion of the frame is offset from the plane of legs 11 to form a handle 12. The lower end portions of legs 11 are also offset from the leg plane as at 14 and these portions 14 jointly support an axle rod 15 which coaxially journals wheels 16 on its end portions outside of the legs 11. The lower terminals 17 of the legs 11 extend radially beyond the peripheries of wheels 16 and carry anti-friction caps 18. A tray rest bar or member 19 (FIGS. 5 and 6) extends transversely and horizontally between the longitudinally central portions of the legs 11. This member 19 is parallel to the axle rod 15.

A rear support frame for the cart is designated generally by the numeral 20. This frame is U-shaped with the side legs 21 thereof parallel and spaced apart equally with the legs 11. The upper ends of legs 21 are respectively and coaxially pivoted as at 22 to the upper portions of the legs 11 just below the offset in frame 10 forming the handle 12. The axis of pivots 22 is transverse and parallel to rod 19 allowing relative opening and closing movement between the frames 10 and 20. Legs 21 are interconnected at their lower ends by the frame cross portion 24 and this portion carries a pair of rear wheels 25 which are supported by castering spindles 26 journaled at transversely spaced points on the frame portion 24. It will be noted that the rear caster wheels 25 are of somewhat smaller diameter and are more closely spaced than the fixed front wheels 16. Legs 21 are also integrally interconnected by a cross rod 27 just below the pivot axis 22, and a cross rod 28 connecting the medial portions thereof, the rods 27 and 28 being parallel to the axis formed by pivots 22.

Upper and lower rectangular tray members denoted respectively at 30 and 31 are supported in horizontal position by the frames. Tray 31 has a marginal rim 32 with a pair of transversely spaced ears 34 depending from the rear portion thereof and journaled on the rod 28. The forward portion of the tray 31 normally rests upon the member 19. A control link 35 is mounted at each side of the tray 31, with the rear ends of said links coaxially pivoted at 36 to medial points on the side extensions of rim 32, and the forward ends journaled on the member 19. These links 35 serve to limit the relative spreading movement of the frames 10 and 20 about their pivotal interconnection at 22. They also serve an additional function, however, to be subsequently described.

The upper tray member 30 is also provided with a peripheral rim here designated at 38. This rim carries downwardly depending transversely spaced ears 39 near the rear end of the tray which are apertured and journaled on the rod 27 to form a hinge connection between the tray and the rear support frame 20. A pair of support rods 40 have their lower ends pivoted to the lower tray 31 at the pivots 36 and extend upwardly therefrom with their upper ends coaxially pivoted to the side portions of rim 38 as at 41. The support rod 40 at each side of the cart is parallel to the corresponding leg 21 and is of such a length as to support the tray 30 in horizontal parallelism with the tray 31 when the cart is in erected or usable condition as shown in FIG. 1. The spacing between pivot 41 and rod 27 is substantially equal to the spacing between pivot 36 and rod 28 and rods 40 thus serve to retain the trays in substantial parallelism as they are moved about their hinge connections.

It will be readily understood that when the cart is in erected condition its primary function is for use as a conventional cart for transporting and serving food, beverages or the like with caster wheels 25 facilitating steering of the cart as the operator pushes or pulls the handle 12. Tray 31 is supported by the rods 28 and 19, while tray 30 is supported by the rods 27 and 40.

When it is desired to store the cart it may be readily and simply collapsed, as will best be understood by observation of FIGS. 2–4. The cart is tilted forwardly (FIG. 2) to rest upon the tip members 18. The operator may then grasp the forward edge of either tray (the upper tray being obviously the more convenient) and by lifting upwardly, as shown in FIG. 3, the trays will be raised about their respective hinge connections 27 and 28, swinging the control link 35 upwardly and forwardly over the rest member 19. As the link 35 swings over center, moving pivot 36 forwardly between the pivots 41 and 19, the grasped tray may then be released or lowered. The weight of the trays will cause them to swing downwardly about their respective hinge connections at 27 and 28. As links 35 swing downwardly about their pivots at 39, the rear support frame 20 will be pulled forwardly against the frame 10 with the end result that the trays 30 and 31 and frames 10 and 20 will be brought together into the relatively compact collapsed condition shown in FIG. 4. The collapsed cart can then be stored in upright position upon the tips 18 with the wheels 16 elevated from the floor.

To re-erect the cart the lower or front edge of upper tray 30 is grasped and swung forwardly and upwardly causing the control links to swing upwardly over center and the tray is then lowered slightly until the lower tray settles upon rest 19. During this operation as the control links and the rear portion of tray 31 move into alignment, the frames will be automatically spread to their erect condition.

The cart is thus very simply converted between its erected and collapsed conditions merely by manually moving the leading edge of the upper tray. It will also be noted that the initial movement of the tray is upward for either collapsing or erecting the cart. Accordingly the cart is gravitationally retained in either condition. The invention accordingly economically and efficiently carries out the aforementioned objectives.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A collapsible cart having upwardly extending front and rear support frames pivotally interconnected at their upper ends and diverging downwardly from their pivotal connection and carrying wheels at their lower ends, a lower tray pivoted at a medial point on the rear frame and extending forwardly through the front frame, a rest on the front frame for supporting the lower tray in horizontal position, an upper tray pivoted to the rear frame and extending forwardly over the lower tray, an upright support rod extending between the trays and having its upper and lower ends respectively pivoted to the trays, said support rod being disposed forward of the rear frame, a fore and aft extending control link having its front and rear ends respectively pivoted to the front frame and lower tray, and all of said pivots having parallel axes transverse to the fore and aft direction.

2. In a collapsible serving cart having a pair of vertically spaced trays supported by a collapsible wheeled frame structure, said trays each having their corresponding rear end portions hinged to the frame structure, rest means on the frame structure supporting the front portion of the lower tray, said rest means movable toward the lower tray hinge as the frame structure is collapsed to allow said tray to swing downwardly about the hinge, and a rigid upright support having its lower end pivoted to the lower tray and its upper end pivoted to the upper tray at a point substantially forward of the upper tray hinge connection.

3. The subject matter of claim 2 wherein a pair of such upright supports are provided one at each side of the trays, said supports lying on a common transverse plane which is substantially parallel to the common plane of said tray hinge axes.

4. A collapsible serving cart comprising front and rear upwardly extending generally planar support frames pivotally interconnected on a horizontal axis near their upper ends and relatively swingable about said axis between closed condition in which they are closed together and an extended condition in which they diverge downwardly, and upper and a lower tray hingedly mounted on the rear frame in vertically spaced positions and being interconnected by parallel linkage for movement of the trays in parallelism between a horizontal condition extending forwardly from the rear frame when the frames are extended and downwardly to a collapsed condition against the rear frame when the frames are closed together, and rest means on the front frame for supporting the trays in horizontal condition when the frames are extended.

5. The subject matter of claim 4 in which rigid link means swingably interconnect the front frame to one of the trays for limiting movement of the frames in an extending direction and for guiding the frames to a closed condition as the trays are moved to their collapsed condition.

6. A collapsible serving cart comprising first and second upwardly extending planar leg frames pivotally interconnected near their upper ends for movement between a collapsed relatively closed position and an erected position with the frame lower ends relatively spread, a pair of trays having end portions hingedly connected to the first frame on vertically spaced axes lying parallel to the interframe pivot axis, rigid support link means spaced from said hinge axes toward said second frame and having its ends respectively pivoted to the trays, said link means being disposed substantially parallel to the common plane of said hinge axes, and rest means on the second frame for engaging the portion of one of said trays remote from its hinge axis to support the tray in horizontal position when the frames are in their erected position.

7. The subject matter of claim 6 wherein both frames carry ground wheels at their lower ends and one of said frames having an end portion projecting beyond the periphery of the wheels thereon to provide a rest for the cart when it is collapsed.

8. In a collapsed serving cart, front legs and rear legs pivotally interconnected on a horizontal axis and swingable relatively about such axis between a collapsed condition in which they are together and parallel and an extended condition in which they are diverging downwardly, an upper and a lower tray, means hingedly connecting the rear portions of said trays at vertically spaced points to said rear legs, a pair of support links connecting the upper and lower trays forward of their hinge connections to retain the trays in parallelism when moved about their hinge connections, a control link connecting the lower tray to the adjacent front leg, means carried by the front legs for supporting the lower tray in generally horizontal position when the legs are extended, said control link when the legs are extended extending generally rearwardly from its pivotal connection to the front leg to its pivotal connection to the lower tray and being swingable upwardly, forwardly, and then downwardly as the front and rear legs move toward each other in collapse of the cart to bring the trays with the legs toward a closed together generally parallel relationship.

9. In a collapsible cart, a rear leg frame having a pair of transversely spaced parallel upright legs, a front leg frame pivoted on a transverse axis to the upper end of the rear leg frame and having a pair of transversely spaced parallel legs extending forwardly and downwardly from said pivot axis, ground wheels mounted on the lower portion of each frame, upper and lower trays extending fore and aft and having their rear portions hinged on vertically spaced parallel transverse axes to the rear frame, a rest member extending transversely between the front legs to engage the forward portion of the lower tray and support said tray in horizontal position when the ground wheels are all in engagement with a horizontal cart supporting surface, a pair of upper shelf support rods extending at each side of the trays therebetween in substantial parallelism with the rear legs, the ends of the rod being pivotally connected to the trays, and an over center control link extending in a fore and aft direction and having its forward end pivoted to a front leg and its rear end pivoted to the lower tray for folding of all of the legs and the trays into parallel planes about said leg frame pivot and said hinge connections as the link is swung forwardly about its front pivot.

No references cited.